Patented June 30, 1936

2,045,739

UNITED STATES PATENT OFFICE 2,045,739

PYROLYSIS OF ACETIC ANHYDRIDE

Peter J. Wiezevich, Elizabeth, N. J., assignor to Standard Oil Development Company, a corporation of Delaware No Drawing. Application July 29, 1932, Serial No. 626,213

5 Claims. (Cl. 260—123)

The present invention relates to improvements in the pyrolysis of acid anhydrides. The invention relates particularly to improvements in the manufacture of ketene $CH_2CO$ from acetic anhydride.

The higher acid anhydrides used in esterifying cellulose, etc., are prepared by treating a higher fatty acid with ketene as claimed in co-pending application Serial No. 556,940 by Steik, Gleason and Wiezevich. The resulting compounds are a mixture of the higher acid anhydride and acetic anhydride. The acetic anhydride is separated by distillation and the higher fatty acid anhydrides are recovered as bottoms.

This invention has, for one of its principal objects, a process for reconverting the acetic anhydride to ketene.

Further objects of the invention will appear as the description proceeds.

The acetic anhydride is passed through a reaction chamber of clay, calorized iron, cement lined iron, iron-copper alloy, or other relatively non-expensive material capable of withstanding the reaction temperature of 600–1200° C. or above. Iron and/or nickel (unalloyed with other metals) are to be avoided since they tend to catalyze the decomposition of the ketene.

The time of heating of the anhydride through the reactor is to be adjusted to give the most optium conversion. That is, at higher temperatures a lower time of contact is required, since prolonged heating decomposes the ketene formed; whereas at low temperatures a longer time of heating is required in order to obtain the desired conversion, which is in the neighborhood of about 5–20% of the inlet anhydride.

Although the reaction may be carried out in the absence of any catalytic material, it is found most desirable to employ a mass of finely divided contact material which is a very good conductor of heat, as copper or copper alloy, aluminum alloy, bronze, silicon, or the like, either by contacting the vapors with the solid contact mass, or by bubbling through the molten metal as claimed in co-pending application Serial No. 569,424 by Wiezevich and Frolich. In the latter case, salts such as borax, sodium chloride, barium chloride, potassium nitrate, or mixtures of such compounds, may also be employed.

When a solid contact mass is employed, a material having a high affinity for water may be used to advantage. Such a material may be a phosphate, metallic bisulfate, metallic tungstate, boric acid, metallic borate, metallic chlorides, or mixtures of such compounds which do not have any deleterious effects upon the reaction mixture. They may be supported on pumice, alumina, etc.

The process is preferably carried out substantially as follows:

Acetic anhydride with or without recycle materials is pumped into a corrosion resistant heat exchanger and then into a reactor (previously described) kept at 800–1000° C. Under these conditions a number of reactions take place with the formation of ketene (which is a gas boiling at −56° C). The reaction mixture is cooled suddenly, either by passing through cooled tubes, or by pumping a liquid into the hot stream. The liquid in this case may be acetic anhydride, or an acid which is to be converted to anhydride, or a selective solvent which will be taken up in detail below.

The gaseous products (ketene, ethylene, carbon monoxide, etc.) may then be separated from the liquid products by direct flashing, fractionation, or the like, and contacted directly with an organic acid which is to be converted to the anhydride by the process described above. The acetic anhydride recovered from this operation is returned as feed to the reactor described above.

The ketene so produced may be use for purposes other than for the production of acid anhydrides, such as for the manufacture of cellulose esters, cyclobutane 1, 3, dione, and the like.

The feed to the reactor may be admixed with gases such as sulfur dioxide, carbon dioxide, and the like.

It is also possible to scrub the reaction products with a solvent, or solvents, such as chlorobenzene, hydrocarbons, butyric acid, benzyl ether, tetrachlorethane, p-cresol acetate, sec-amyl acetate, phenetole, isopropyl ether, and/or others which will dissolve the desirable materials, leaving most of the water (produced by the reaction) in a separate phase, so that it may be withdrawn readily. The solvent must be of the correct boiling range so as to make its recovery fairly simple.

This process may also be employed in the preparation of ketenes from higher acid anhydrides of both aliphatic and cyclic series.

The advantages of this invention are that a constant supply of ketene is made available by the use of a non-expensive reactor. The conversion rate may be regulated to yield 5–20% production of ketene per pass. The conversion of higher fatty acids to higher fatty acid anhydrides may be made continuously and moisture-free ketene is produced.

It will be understood that the foregoing description is merely illustrative of the invention, and that various changes and alternative procedures and proportions may be adopted within the scope of the appended claims, in which it is my intention to claim all novelty inherent in the invention as broadly as the prior art permits.

I claim:

1. The method of producing a ketene from an organic acid anhydride, which comprises subjecting said acid anhydride to a temperature of 600° to 1200° C., in the presence of a heat conducting material, introducing into the reacted stream an organic liquid compound substantially insoluble in water and inert to ketene, separating the water settled out, and recovering ketene, acid anhydride and said organic liquid from the remaining materials.

2. The method of producing ketenes which comprises subjecting an acid anhydride to a temperature of 600° to 1200° C., in the presence of a heat conducting material and in the presence of a gas of the group consisting of sulfur dioxide and carbon dioxide.

3. The method of producing ketene from acetic anhydride which comprises subjecting acetic anhydride to a temperature of 600° to 1200° C. with a time of contact through the heated zone sufficient to obtain a conversion of 5 to 20% of the inlet anhydride, withdrawing and cooling the resulting products, immediately separating ketene, other gases, and water therefrom, and recirculating the residual materials through the reaction zone.

4. The method of producing higher fatty acid anhydrides, which comprises subjecting acetic anhydride to a reaction temperature in the presence of a solid contact mass having a high affinity for water, immediately separating the ketene from the water vapor formed, reacting the ketene with a higher fatty acid, separating and recycling the acetic anhydride and recovering the higher fatty acid anhydride.

5. The method of producing ketenes which comprises subjecting organic acid anhydrides to a reaction temperature under dehydrating conditions, introducing into the reacted stream an organic liquid compound substantially insoluble in water and inert to ketene, separating the water settled out and recovering ketene, acid anhydride, and said organic liquid from the remaining materials.

PETER J. WIEZEVICH.